United States Patent [19]

Bekkers

[11] Patent Number: 5,160,295
[45] Date of Patent: Nov. 3, 1992

[54] DEVICE FOR FORMING A CUT IN BREAST AND BELLY OF A SLAUGHTERED ANIMAL CARCASS

[75] Inventor: Marinus F. L. Bekkers, Son en Breugel, Netherlands

[73] Assignee: C. C. M. Beheer B.V., Ad Nuenen, Netherlands

[21] Appl. No.: 702,096

[22] Filed: May 17, 1991

[30] Foreign Application Priority Data

May 17, 1990 [NL] Netherlands .......................... 9001154

[51] Int. Cl.[5] .............................................. A22C 15/00
[52] U.S. Cl. .................................... 452/160; 452/149
[58] Field of Search ............... 452/160, 165, 149, 163, 452/150

[56] References Cited

U.S. PATENT DOCUMENTS 3,095,602  7/1963  Köttner ............................. 452/160
4,653,150  3/1987  Leining ............................. 452/160

Primary Examiner—Bruce M. Kisliuk
Assistant Examiner—Lawrence Cruz
Attorney, Agent, or Firm—Fiddler & Levine

[57] ABSTRACT

Device for forming a cut in breast and belly of the carcass of a slaughtered animal comprising a mandrel, a cutting blade and two pressure rollers lying on either side of the mandrel engaging the rear side of the carcass near the head, each roller being fitted at the first end of an arm which at the other end is connected to a carrier situated beside the mandrel and extendable in the direction of the carcass, which arms can each be swung about the longitudinal axis of the carrier the roller being provided with a disc-shaped flange right angles to the roller axis.

5 Claims, 4 Drawing Sheets

DEVICE FOR FORMING A CUT IN BREAST AND BELLY OF A SLAUGHTERED ANIMAL CARCASS

BACKGROUND OF THE INVENTION

The invention relates to a device for forming a cut in the carcass of a slaughtered animal which is taken, hanging by the hind legs, until it is in front of this device, comprising an upright mandrel carried by a frame and interacting with a cutting blade which is movable relative thereto, and positioning and retaining devices engaging on the rear side of the carcass.

DESCRIPTION OF THE PRIOR ART

Such a device is known per se from NL-A-8602219.

This known device can be placed in front of a device set up opposite it (as known from NL-A-8602220) for severing the pubis; the carcasses to be treated are thus conveyed between the two devices. In this case the positioning and retaining devices are formed by push rods going out from the latter-mentioned processing device.

If, however, one wants a design in which the device which is the subject of this application is freely accessible at the front side and the second device is set up next to it, the fitting of such push rods is difficult to achieve.

The object of the invention is to eliminate this disadvantage and to achieve simple and yet good positioning in a device of the present type.

SUMMARY OF THE INVENTION

This object is achieved according to the invention by the use of two pressure rollers lying on either side of the mandrel for the purpose of engaging the rear side of the carcass near the head, each roller being fitted at the first end of an arm which at the other end is connected to a carrier situated beside the mandrel and extendable in the direction of the carcass, which arms can each be swung about the longitudinal axis of the carrier, while at the end situated near the arm each roller is provided with a disc-shaped flange situated at right angles to the roller axis.

Preferably the device comprises two essentially vertical push rods situated on either side of the mandrel, for the purpose of engaging the front legs of the carcass and for pushing them outwards, each fitted on a carrier which can be extended in the direction of the carcass, and each capable of being swung about the longitudinal axis thereof.

In a preferred embodiment two upright positioning rods are situated on either side of the mandrel and in the free position projecting past the mandrel, for the purpose of resting against the breast side of the carcass on either side of the breastbone, and each rotatable about a shaft fitted near the bottom end of the cutting blade, and directed away from said cutting blade under spring tension.

DESCRIPTION OF THE DRAWINGS

FIG. 1 is a perspective view of the device according to the invention, with a pig carcass;

DESCRIPTION OF A PREFERRED EMBODIMENT

Figure 2:
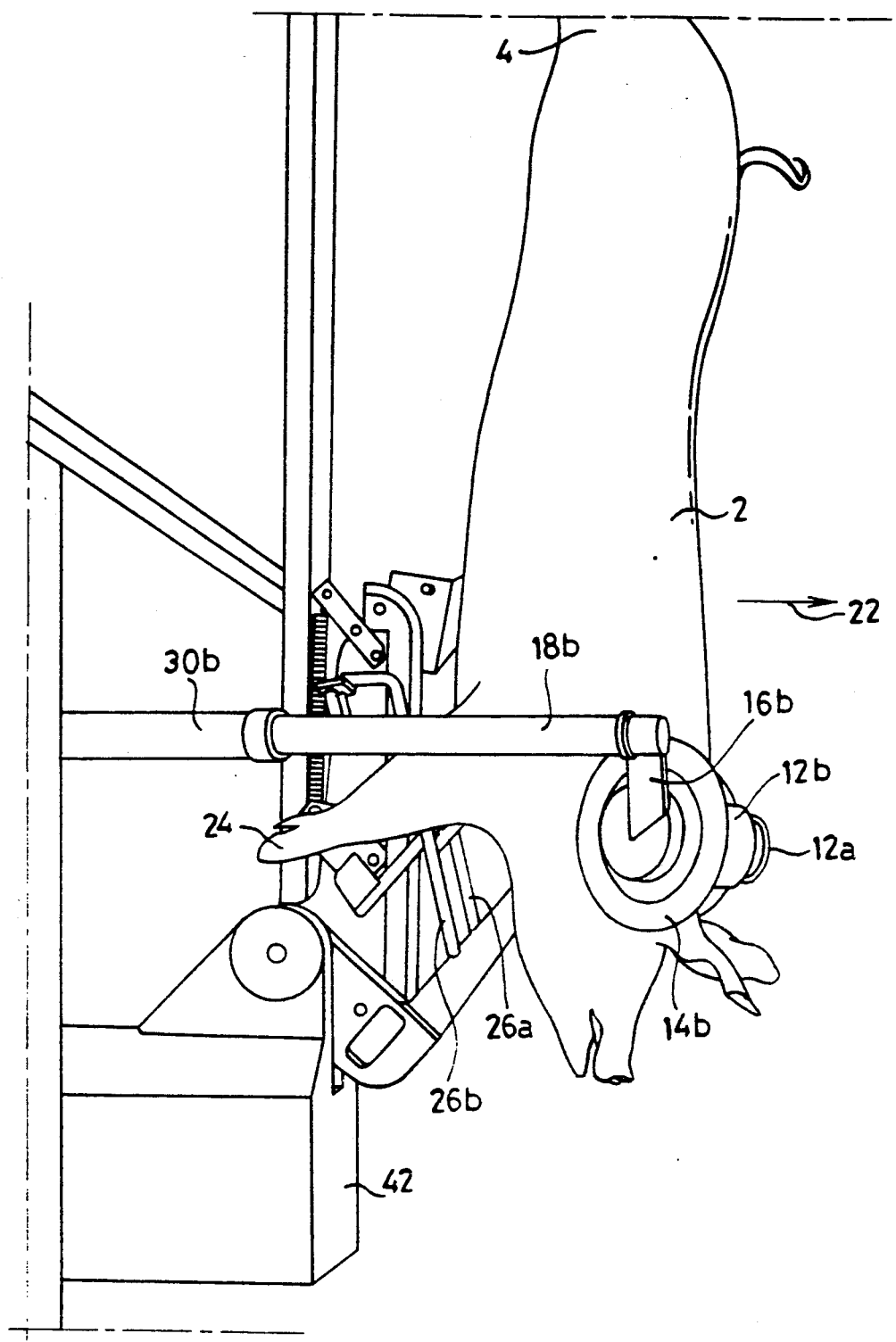
FIG. 2 is a perspective view on a larger scale of the various parts of said device.
Figure 2:
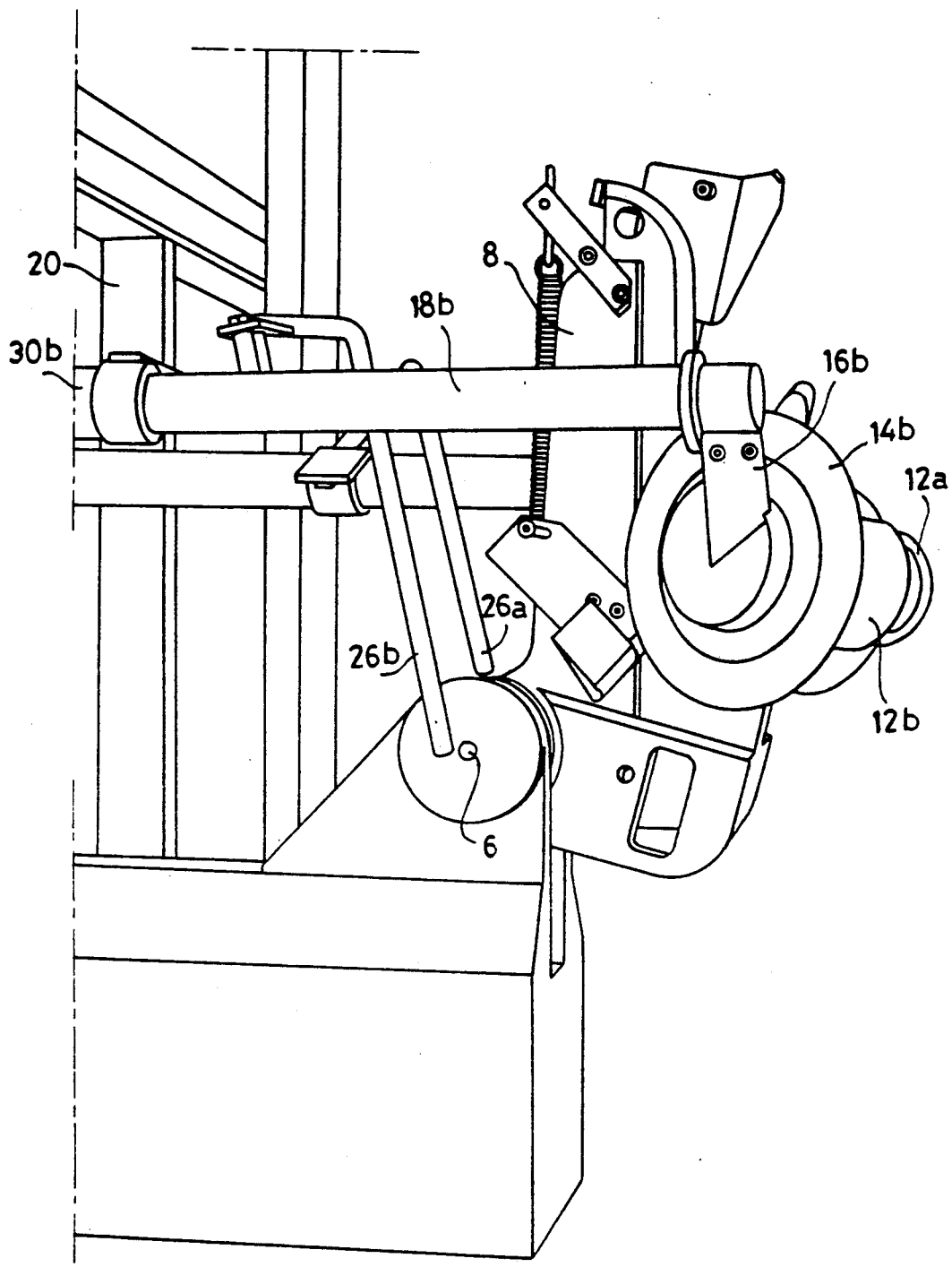
Figure 3:
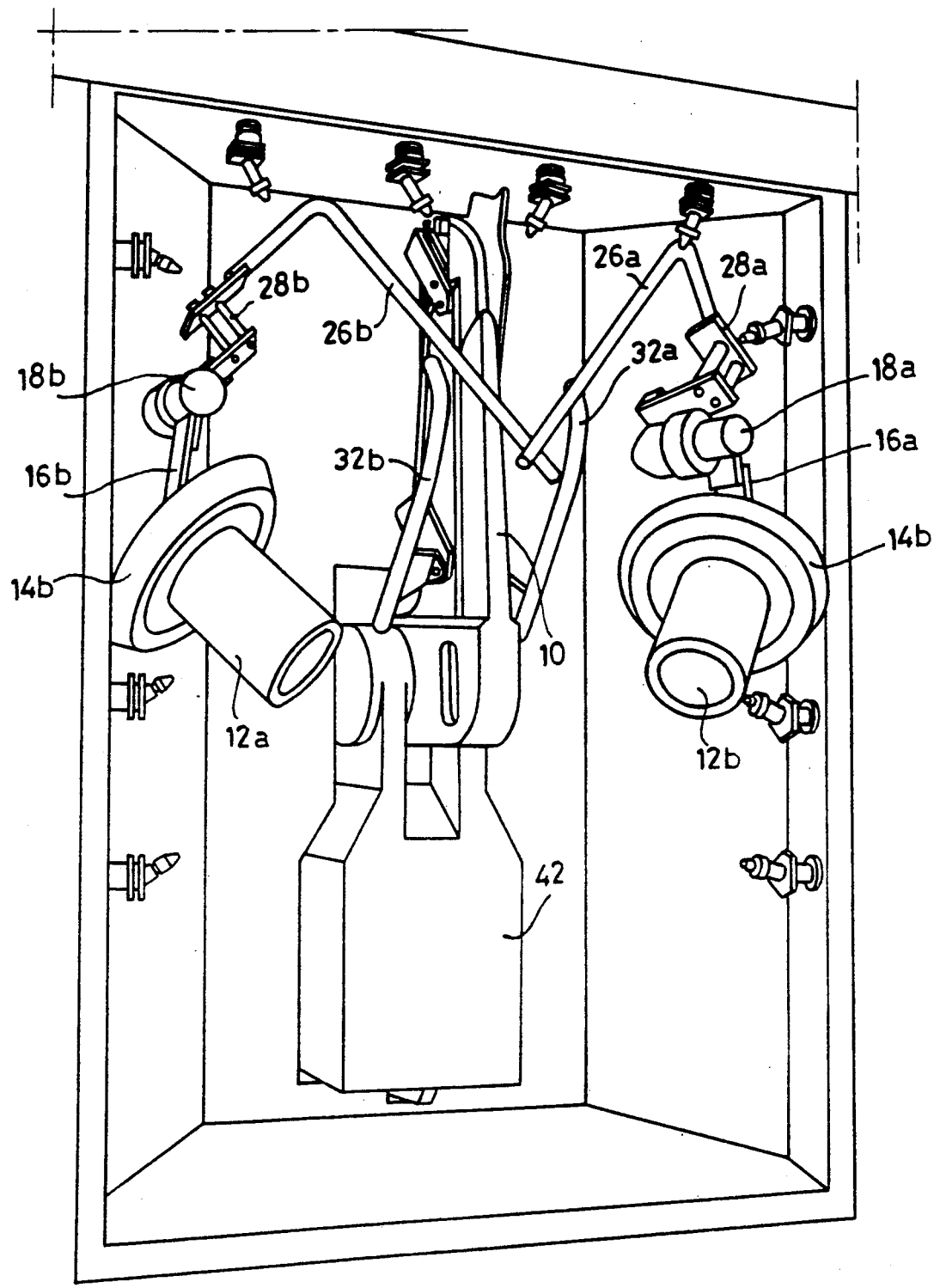
FIG. 3 is an oblique front view of this device.

In FIG. 1 reference numeral 2 indicates the carcass of a slaughtered animal, in this case a pig, which is hanging by its hind legs 4 from a suitable conveyor. The carcass is conveyed along a device of the kind which is subject of NL-A-8602219, with which device breast and belly of the carcass are cut open.

Figure 4:
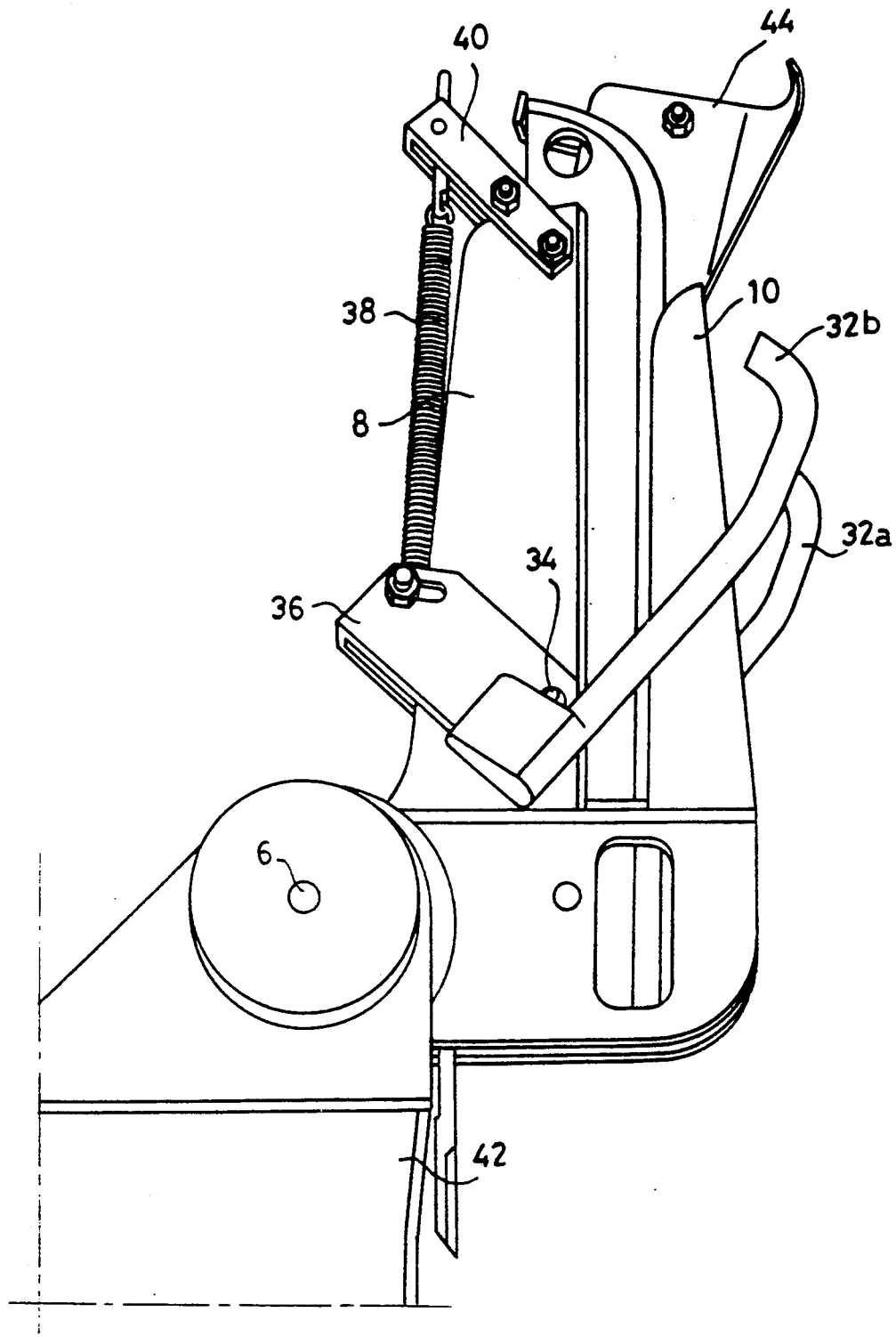
FIG. 4 is a perspective view of the cutting device used according to the invention, with positioning rods engaging the breastbone of the carcass.

This cutting device essentially comprises a cutting blade 8 which is rotatable about an axis 6, and interacting therewith a mandrel 10 (see in particular FIGS. 2 and 4) forming an end support for the cutting blade. The way in which these elements operate and are used is described in detail in NL-A-8602219, and will therefore not be explained further here.

For the purpose of positioning of the carcass 2 relative to these elements, the device according to the invention is provided with a number of positioning and retaining elements: two pressure rollers 12a, 12b, each having at one end a disc-shaped flange 14a, 14b situated at right angles to the axis of rotation thereof. The shaft (not shown in the figures) of each pressure roller is fixed to an arm 16a, 16b respectively, and each arm is fixed to the end of a rod 18a, 18b respectively. By means of a suitable drive mechanism (not shown) the arms 18a, 18b can be moved forward out of the frame 20 of the device, while they can also be rotated about their axis. This means that, when a carcass 2 has arrived in front of the device, the rollers 12a, 12b can be moved, from the position in which they are turned away to the left and right, past the carcass 2 (in the direction of the arrow 22), then turned back to the position shown in FIG. 1 and subsequently retracted so that they not only position the carcass in the correct position relative to the cutting elements 8, 10, but also prevent the carcass from moving away from these elements, i.e. in the direction of the arrow 22.

For an unimpeded formation of the cut it is important that the front legs of the carcass, one of which can be seen in FIG. 1 and is indicated by 24, are spread. This takes place by means of two square push rods 26a, 26b, each fitted by means of a connecting piece 28a, 28b on the end of a carrier 30a, 30b, which —like the carriers 18a, 18b —can be moved towards and away from the frame 20 and is also rotatable about its axis. The figures show how the carriers 18a, 30a, on the one hand, and 18b, 30b, on the other, are combined with each other in an advantageous manner in that the carriers 30a, 30b are hollow and the carriers 18a, 18b are fitted inside them. The mechanism for extending and retracting as well as rotating the carriers 30a, 30b about the longitudinal axis is not shown in the figures; it is clear that the expert will easily be able to design a suitable mechanism for this.

Finally, the device according to the invention is also provided with two additional positioning rods 32a, 32a, 32b which are connected, so that they can rotate about a common axis 34 situated near the bottom side of the cutting blade 8, to a U-shaped carrier 36 which is held under spring tension by means of a spring 38 which is fitted between the carrier 36, on the one hand, and a support 40 fixed to the top side of 0 the blade, on the other. This means that the rods 32a, 32b are pressed resiliently against the breast of the carcass on either side of the breastbone, so that not only is the carcass positioned better relative to the interacting elements 8 and 10, but it is also ensured that the breast cut is formed straight through the breastbone, and not at the side thereof.

The entire cutting unit, comprising the elements 8, 10 with the push rods 32a, 32b, is accommodated in the known manner in a frame 42 which can be moved from the frame 20 forwards and back, and also up and down.

After positioning of the carcass 2, and after the pressure rollers 12a, 12b have come to rest at the correct place on the rear side of the carcass near the head, the frame 42 is moved forward in the way described in NL-A-8602219, in which case the mandrel 10 is pushed through the stab hole into the carcass; these elements then carry out the movements as described in NL-A-8602219, as a result of which the breast and belly of the carcass are cut open. The correct position of the carcass 2 remains ensured by means of the positioning elements described above, so that the cutting operation is also carried out correctly.

An angularly flanged pressure plate 44 is preferably fitted at the top end of the blade 8, for the purpose of pushing the penis of a male animal carcass aside when the cut is being formed.

What is claimed is:

1. Device for forming a cut in breast and belly of the carcass of a slaughtered animal which is taken, hanging by the hind legs, in front of this device, comprising an upright mandrel carried by a frame and co-operating with a cutting blade which is movable relative thereto, and positioning and retaining devices engaging the rear side of the carcass, comprising two pressure rollers lying on either side of the mandrel for the purpose of engaging the rear side of the carcass near the head, each roller being fitted at the first end of an arm which at the other end is connected to a carrier situated beside the mandrel and extendable in the direction of the carcass, which arms can each be swung about the longitudinal axis of the carrier, while at the end situated near the arm each roller is provided with a disc-shaped flange situated at right angles to the roller axis and two essentially vertical push rods situated on either side of the mandrel, for the purpose of engaging the front legs of the carcass and for pushing them outwards, each fitted on a carrier which can be extended in the direction of the carcass, and each capable of being swung about the longitudinal axis thereof.

2. Device for forming a cut in breast and belly of the carcass of a slaughtered animal which is taken, hanging by the hind legs, in front of this device, comprising an upright mandrel carried by a frame and co-operating with a cutting blade which is movable relative thereto, and positioning and retaining devices engaging the rear side of the carcass, comprising two pressure rollers lying on either side of the mandrel for the purpose of engaging the rear side of the carcass near the head, each roller being fitted at the first end of an arm which at the other end is connected to a carrier situated beside the mandrel and extendable in the direction of the carcass, which arms can each be swung about the longitudinal axis of the carrier, while at the end situated near the arm each roller is provided with a disc-shaped flange situated at right angles to the roller axis and two upright positioning rods are situated on either side of the mandrel and in the free position projecting past the mandrel, for the purpose of resting against the breast side of the carcass on either side of the breastbone, and each rotatable about a shaft fitted near the bottom end of the cutting blade, and directed away from said cutting blade under spring tension.

3. Device according to claim 2, in which the positioning rods ends are flanged towards the mandrel.

4. Device according to claim 1, comprising two telescoping carrying rods, each comprising a first, stationary part, a second, telescopic part which lies inside it and forms the carrier for a leg push rod, and a third part lying inside this second part and constituting the carrier for a pressure roller arm.

5. Device for forming a cut in breast and belly of the carcass of a slaughtered animal which is taken, hanging by the hind legs, in front of this device, comprising an upright mandrel carried by a frame and co-operating with a cutting blade which is movable relative thereto, and positioning and retaining devices engaging the rear side of the carcass, comprising two pressure rollers lying on either side of the mandrel for the purpose of engaging the rear side of the carcass near the head, each roller being fitted at the first end of an arm which at the other end is connected to a carrier situated beside the mandrel and extendable in the direction of the carcass, which arms can each be swung about the longitudinal axis of the carrier, while at the end situated near the arm each roller is provided with a disc-shaped flange situated at right angles to the roller axis and an angularly flanged pressure plate fitted at the top end of the cutting blade and projecting beyond said top end.

* * * * *